US007807086B2

(12) United States Patent
Perneborn

(10) Patent No.: US 7,807,086 B2
(45) Date of Patent: Oct. 5, 2010

(54) METHOD OF STRENGTHEN A FIBROUS BODY FOR ABSORBENT ARTICLES

(75) Inventor: Robert Perneborn, Göteborg (SE)

(73) Assignee: SCA Hygiene Products AB, Gothenburg (SE)

( * ) Notice: Subject to any disclaimer, the term of this patent is extended or adjusted under 35 U.S.C. 154(b) by 1509 days.

(21) Appl. No.: 10/904,509

(22) Filed: Nov. 14, 2004

(65) Prior Publication Data

US 2005/0118399 A1    Jun. 2, 2005

Related U.S. Application Data

(60) Provisional application No. 60/525,217, filed on Nov. 28, 2003.

(51) Int. Cl.
   *B29C 49/00* (2006.01)
(52) U.S. Cl. .................... 264/284; 264/168; 264/250; 264/251; 264/252; 264/257; 264/258; 264/282; 264/293; 264/294; 264/296; 264/320; 264/324; 428/156; 428/170; 428/171; 428/218
(58) Field of Classification Search ............... 264/284, 264/168, 250, 251, 252, 257, 258, 282, 293, 264/294, 296, 320, 324; 428/156, 170, 171, 428/218
   See application file for complete search history.

(56) References Cited

U.S. PATENT DOCUMENTS

| 2,073,329 | A |   | 3/1937  | Winter |
|-----------|---|---|---------|--------|
| 3,766,922 | A | * | 10/1973 | Krusko .................... 604/374 |
| 3,860,002 | A |   | 1/1975  | Kolbach |
| 4,016,628 | A | * | 4/1977  | Kolbach .................. 19/148 |
| 5,746,729 | A |   | 5/1998  | Wada et al. |
| 6,170,393 | B1 |  | 1/2001  | Hook et al. |
| 6,361,638 | B2 |  | 3/2002  | Takai et al. |
| 2002/0168909 | A1 | | 11/2002 | Edwardson et al. |

FOREIGN PATENT DOCUMENTS

| JP | H04-022922  | 2/1992 |
| JP | H08-117277  | 5/1996 |
| JP | H11-508478  | 7/1999 |
| JP | 2002-515294 | 5/2002 |
| JP | H10-077566  | 5/2002 |
| JP | 2004-501676 | 1/2004 |
| WO | WO 97/40804 | 11/1997 |
| WO | WO 01/72251 | 4/2001 |

OTHER PUBLICATIONS

International-Type Search Report dated Jun. 4, 2004.
Examination Report dated May 6, 2010 in corresponding Japanese patent application No. 2006-541076.

* cited by examiner

*Primary Examiner*—Jeffrey Wollschlager
*Assistant Examiner*—Stella Yi
(74) *Attorney, Agent, or Firm*—Buchanan Ingersoll & Rooney PC

(57) ABSTRACT

A method of strengthening a boundary region between a first portion and a second portion of a fibrous body for absorbent articles. This boundary region is provided with a pattern of compressed spots, the amount of compression being gradually increasing in a direction leading away from an edge of the first portion of the fibrous body. Also, an apparatus for performing the method and an absorbent body having a strengthened boundary region.

17 Claims, 6 Drawing Sheets

METHOD OF STRENGTHEN A FIBROUS BODY FOR ABSORBENT ARTICLES

CROSS-REFERENCE TO RELATED APPLICATIONS

The present application claims the benefit of U.S. Provisional Application No. 60/525,217, filed in the United States on Nov. 28, 2003, the entire contents of which are hereby incorporated herein by reference.

TECHNICAL FIELD

The present invention relates to a method and apparatus for strengthening a boundary region between a first portion and a second portion of a fibrous body for absorbent articles, such as disposable diapers, panty diapers, sanitary napkins, incontinence guards and the like. The invention also relates to a fibrous body strengthened by the method.

BACKGROUND OF THE INVENTION

Absorbent bodies for absorbent articles, such as disposable diapers, panty diapers, sanitary napkins, incontinence guards and the like, are commonly manufactured by delivering fibrous bodies on a moving web and thereafter compressing the bodies by passing the bodies through the nip between a pair of rollers. By adjusting the nip between the rollers, a desired density of the fibrous bodies can be obtained in order to give the bodies sufficient mechanical strength and appropriate capillary action. If the fibrous bodies have portions with different basis weight, such as a thicker portion in the central crotch part of an absorbent article, the compressing of the thin portion can be made by a pair of rollers having a cut-out to accommodate the thick portion of the body, the compressing of the thick portion being made by a separate pair of rollers or by the inner wall of an appropriate dimensioned cut-out. If the thick portion is not wholly accommodated in the cut-out, the parts thereof lying outside the cut-out have to pass a portion of the nip between the rollers, which is dimensioned for compressing the thin portion of the fibrous body. If this occur, there is a great risk that the desired density in the thin portion of the body will not be obtained. Furthermore, the parts of the thick portion lying outside the cut-out will be compressed to an unduly high density, the fibers in the body might break and capillary action might be lost in these parts. The thick portion can also be so thick that it can not be compressed to such an extent that it can pass the nip between the rollers, leading to a stand still in the manufacturing process. For these reasons the area of the cut-out is made somewhat larger than the area of the thick portion of the fibrous body. The difference between the areas of the cut-out and thick portion of the fibrous body is of course dependent on the accuracy of registration of the thick portion of the bodies laid on the moving web and the cut-out or cut-outs on the rotating rollers. However, even if the accuracy is high, such a difference in areas must be present in order to ensure that the thick portion of each fibrous body will be accommodated within the cut-out or a cut-out in the pair of compressing rollers.

As a consequence of the difference in areas of the thick portion of the fibrous body and the cut-out in the roller there is, in the thin portion, a boundary region around the edge of the thick portion that remains uncompressed after passage of the nip between the rollers. This boundary region has very little mechanical strength and will easily break.

OBJECTS AND SUMMARY

It is an objective of the present invention to provide means for strengthening such a boundary region.

This objective is accomplished by a method of strengthening a boundary region between a first portion and a second portion of a fibrous body for absorbent articles, which comprises providing said boundary region with a pattern of compressed spots, the amount of compression being gradually increasing in a direction leading away from the edge of said first portion of said fibrous body.

In a preferred embodiment the area compressed according to said pattern is gradually increasing in a direction leading away from the edge of said first portion of said fibrous body and said pattern reaches into the first portion of said fibrous body.

In a first alternative of the preferred embodiment, said pattern has a gradually increasing number of compressed spots per unit area in a direction leading away from the edge of the first portion of said fibrous body, the compressed spots being compressed to the same depth in relation to an upper side of said first portion of said fibrous body.

In a second alternative, said pattern has the same number of compressed spots per unit area, the compressed spots having a gradually increasing size in a direction leading away from the edge of the first portion of said fibrous body, the compressed spots being compressed to the same depth in relation to an upper side of said first portion of said fibrous body.

In a second embodiment, the spots in said pattern are compressed to different depths in relation to an upper side of said first portion of said fibrous body.

An embodiment of the invention also relates to an apparatus for strengthening a boundary region between a first portion and a second portion of a fibrous body for absorbent articles, comprising a pair of rollers and means for passing a fibrous body having at least one first portion and at least one second portion through a nip between said pair of rollers, wherein at least one pattern of protrusions is provided on an outer peripheral surface of at least one of the rollers, whereby said pattern has an opening, wherein the protrusions extend around the edge thereof, each protrusion projects outwardly from an outer peripheral surface of said roller and has a cross-section in a plane tangential to a peripheral outer surface of said roller, and that the sum of cross-sectional areas of the protrusions per unit area is gradually increasing in a direction leading away from the edges of said opening.

In a preferred embodiment, at least one of the rollers in said pair of rollers comprises a cut-out to accommodate a first portion of a fibrous body, said opening in the pattern of protrusions being coaxial to the cut-out but has a smaller size so that the pattern of protrusions reaches beyond the edges of said cut-out into a portion thereof.

In a first alternative, said protrusions have the same cross-sectional size and said pattern has a gradually increasing number of protrusions per unit area in directions leading away from the edges of said opening, the tips of all the protrusions lying in the same plane tangential to a peripheral outer surface of said roller.

In a second alternative, said pattern has the same number of protrusions per unit area in directions leading away from the edges of said opening, the size of the cross-sections of said protrusions gradually increasing in size in directions leading away from the edges of said opening, the tips of all protrusions lying in the same plane tangential to a peripheral outer surface of said roller.

In a second embodiment of an apparatus for performing the inventive method, the tips of the protrusions lie in different planes tangential to a peripheral outer surface of said roller.

An embodiment of the invention further relates to a fibrous body for absorbent articles having at least one first portion and a second portion adjacent to said first portion, wherein a boundary region between a first portion and the second portion adjacent thereto is provided with a pattern of compressed spots, the amount of compression in the boundary region is gradually increasing in a direction leading away from the edge of said first portion of said fibrous body.

In a preferred embodiment, the compressed area in the boundary region is gradually increasing in a direction leading away from the edge of said first portion of said fibrous body and said pattern of compressed spots reaches into the first portion of said fibrous body.

In a first alternative, said pattern has a gradually increasing number of compressed spots per unit area in a direction leading away from the edge of the first portion of said fibrous body, the compressed spots being compressed to the same depth in relation to an upper side of said first portion of said fibrous body.

In a second alternative, said pattern has the same number of compressed spots per unit area, the compressed spots having a gradually increasing size in a direction leading away from the edge of the first portion of said fibrous body, the compressed spots being compressed to the same depth in relation to an upper side of said first portion of said fibrous body.

In a second embodiment, the spots in said pattern are compressed to different depths in relation to an upper side of said first portion of said fibrous body.

BRIEF DESCRIPTION OF THE DRAWINGS

The invention will now be described with reference to the enclosed Figures, of which.

DETAILED DESCRIPTION OF THE PREFERRED EMBODIMENTS

Figures 1, 2:
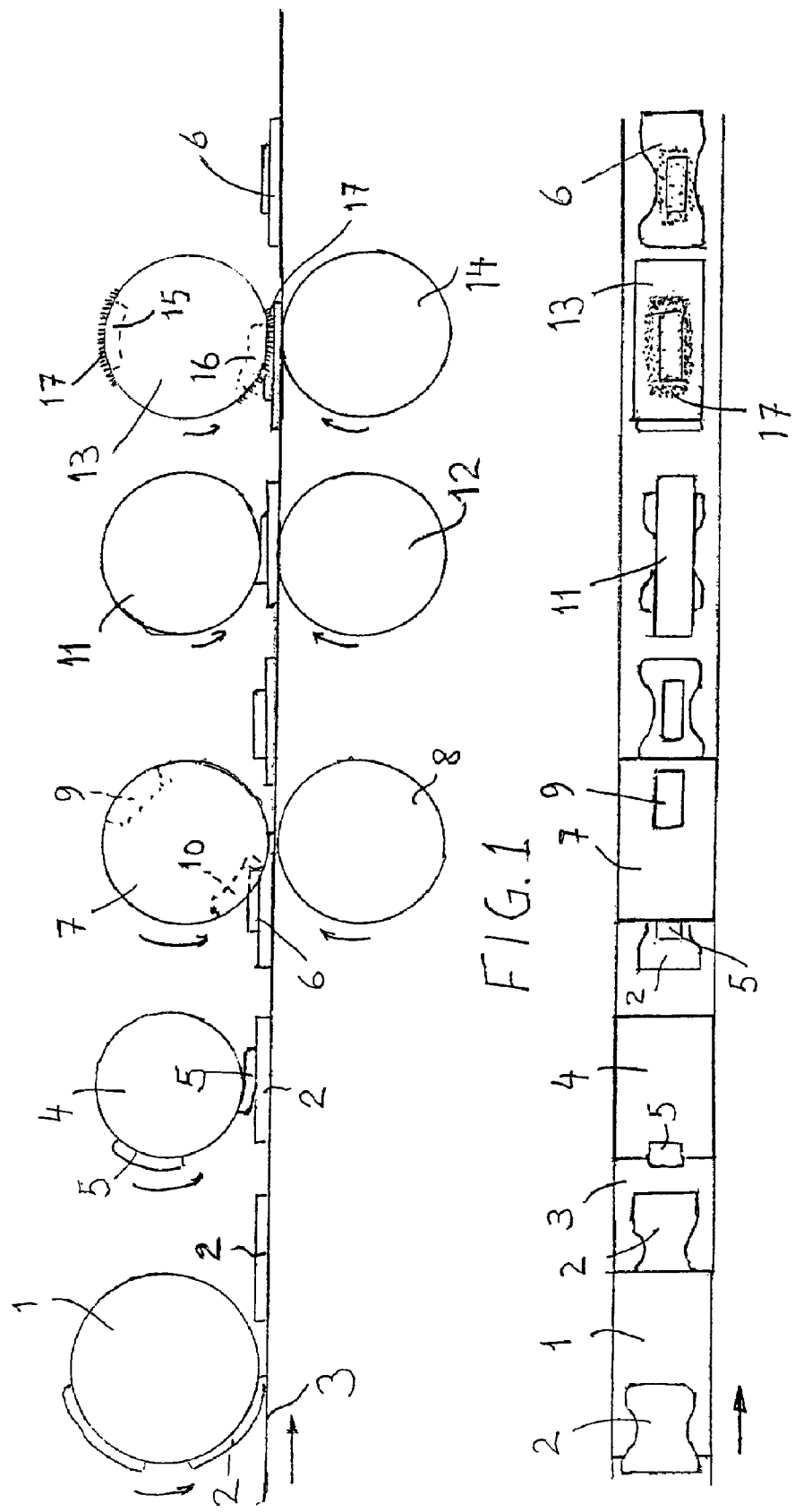
FIG. 1 schematically shows a side view of an apparatus for compressing an absorbent body according to a preferred embodiment of the invention.
FIG. 2 shows a plan view of the apparatus in FIG. 1, FIG. 3 schematically shows a side view of an absorbent body after compressing of the thick and thin portions.

The apparatus shown in FIGS. 1 and 2 comprises a first transfer wheel 1 for placing a first layer 2 of air-laid cellulose fluff on a running web 3 which could be a web of casing sheet material or the upper part of an endless conveyer. The first layer 2 is preferably formed in a mat former wheel (not shown) and then deposited on transfer wheel 1. If the first layer 2 can be formed in synchrony with the advance of the running web 3, the transfer wheel can be omitted and the wheel 1 can be a mat former wheel. As can be seen from FIG. 2, the layer 2 has an hourglass shape. The direction of travel of the web 3 is to the right in FIGS. 1 and 2 as is indicated by arrows.

Downstream of wheel 1 a second transfer wheel 4 is disposed for placing a second layer 5 of air-laid cellulose fluff onto a central part of the first layer 2. As is evident from FIGS. 1 and 2, the first layer 2 extends beyond the periphery of the second layer 5 on all sides thereof. Thereby a fibrous body 6 having a thin portion and a central thick portion is obtained, the thin portion being the parts of the first layer extending outside of the periphery of the second layer 5.

A first pair of compressing rollers 7, 8 for densifying the thin portion of the fibrous body 6 is disposed downstream of the wheel 4. The roller 7 of the first pair of compressing rollers is provided with cut-outs 9, 10 to accommodate the thick portion of the bodies 6, i.e. layer 5 and the central part of layer 2 underlying layer 5, when these portions pass the nip between rollers 7, 8. The cut-outs 9, 10 are disposed on the roller 7 so that the thick portions of subsequent fibrous bodies 6 passing the nip will alternatively be accommodated in cut-outs 9 and 10. In order to ensure that no part of the layers 5 of the passing bodies 6 will be located outside the cut-outs 9, 10, these cut-outs have a larger area than the layers 5. In the shown embodiment the depths of the cut-outs are equal to the height of layers 5 or larger.

The difference in areas between the cut-outs and layers 5, i.e. the tolerance needed for the cut-outs, is, among other factors, dependent on the accuracy of the depositing of the layers 2, 5 on the running web 3, the synchronization between the speed of the web 3 and the rotational speed of rollers 7, 8, and also how firmly the bodies 6 are held on the web (usually with the help of suction).

A second pair of compressing rollers 11, 12 is disposed downstream of the first pair of rollers 7, 8. When the fibrous bodies 6 pass between the nip of rollers 11, 12 the thick portions of the bodies 6 are compressed.

Figure 3:
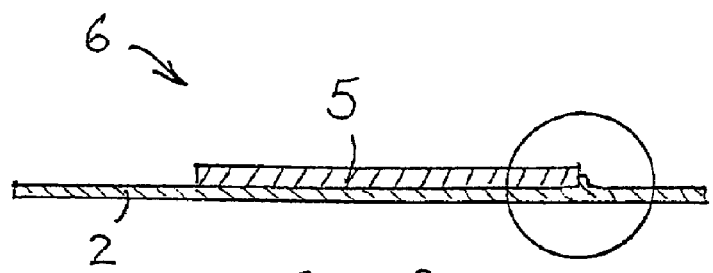
FIG. 3A shows a part of the absorbent body in FIG. 3 in a larger scale, FIG. 4 schematically shows a plan view of an absorbent body produced by the apparatus in FIGS. 1 and 2.
Figure 3A:
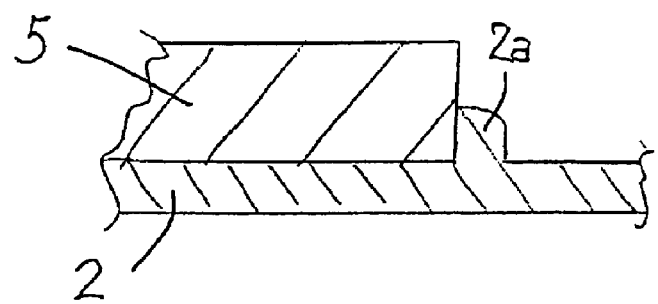

In FIGS. 3 and 3A a fibrous body 6 is schematically shown directly after having passed the pair of rollers 11, 12. Since the cut-outs 9, 10 have a larger area than the thick portion (layer 5) of the fibrous body 6, the thin portion 2 will be uncompressed in a boundary region 2a around the periphery of layer 5. Moreover, this uncompressed boundary region 2a will have different width at the different sides of layer 5 and will also vary for the different fibrous bodies 6 that successively pass the two pairs of compressing rollers 7, 8 and 11, 12, respectively. This difference will often be largest for the edges of the layer 5 being perpendicular to the direction of travel of the web 3. The consequence of the uncompressed boundary region 2a is that the body 6 will have very little strength in this region and will easily break during the handling of such bodies during the remaining manufacturing and packaging steps or when handled by a user.

According to the invention a pair of rollers 13, 14 for providing said boundary region with a pattern of compressing spots is disposed downstream of the rollers 11, 12 for compressing the thick portion of the fibrous body 6. Also in this case the roller 13 in contact with the side of the fibrous body containing the layer 5 is provided with two cut-outs 15, 16 for accommodating the thick portions of the bodies 6 successively passing the nip between said rollers. The roller 13 is also provided with a pattern 17 of protrusions. This pattern 17 extends around the edges of each cut-out 15, 16 and has a width corresponding to the width of the boundary region of the fibrous body 6. Moreover, the pattern also preferably extends into the cut-outs 15, 16 in an edge region thereof.

In the shown embodiment, the pattern 17 is formed by protrusions having a circular cross-section and a half-spherical tip. The tips of all protrusion lie in the same plane tangential to the peripheral outer surface of roller 13, i.e. the protrusions are extended to the same radial distance from the outer surface of the roller 13. This means that the protrusions within the cut-outs have a greater length than the protrusions outside the cut-outs. Furthermore, said pattern 17 has a gradually increasing number of protrusions per unit area in directions leading away from the edges of the cut-outs.

Figure 4:
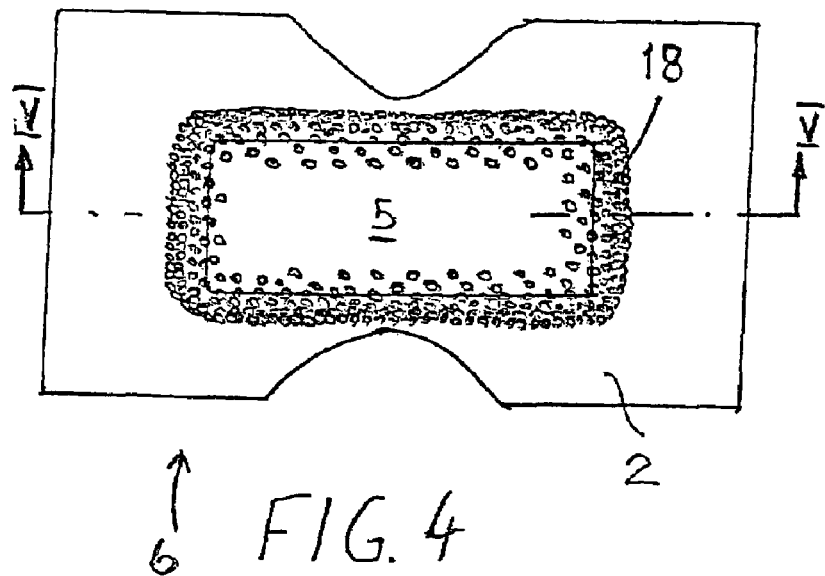
Figure 5:
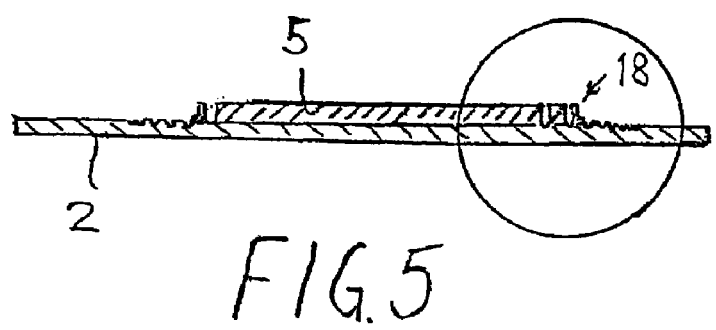
FIG. 5 shows a sectional view along line V-V in FIG. 3.
Figure 5A:
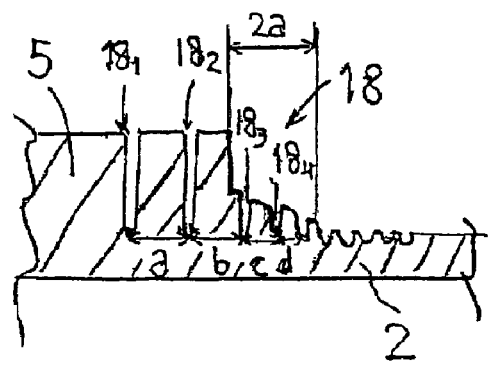
FIG. 5A shows a part of the absorbent body in FIG. 5 in a larger scale.

In FIGS. 4, 5 and 5A, a fibrous body 6 is shown after having passed the nip between rollers 13, 14. The pattern 17 of protrusion has produced a pattern of compressed spots 18 in the boundary region around the edges of the thick portion 5, a pattern also reaching a short distance into the thick portion, as is schematically indicated in these Figures. The number of compressed spots per unit area is gradually increasing in directions leading away from the edges of the thick portion, i.e. from an edge of the thick portion 5 towards the nearest edge of the thin portion 2. The exact position of the pattern of compressed spot on the fibrous body 6 is of course dependent of the registration of the thick portion of the advanced fibrous body 6 in relation to the cut-out 15 or 16. This registration will, as mentioned above, vary for the individual bodies passing the rollers 13, 14, the largest variation being in the direction of travel of the web 3. Thus, for one body 6, the side of the thick portion lying forward in the travel direction will be closer to the adjacent wall of the cut-out 15 or 16 of roller 13 than the corresponding side of the thick portion of the next body 6 passing the rollers 13, 14. In order to ensure that the pattern of protrusions 17 will reach all points of the boundary region 18 around the periphery of the thick portion 5, the pattern of protrusions 17 thus preferably reaches a short distance into the respective cut-out 15 or 16 around the periphery thereof. In FIGS. 4 and 5, the right end, as seen in the Figures, of the thick portion 5 was positioned closer to its adjacent wall of the cut-out 15 or 16 than the left end of the thick portion when passing the rollers 13, 14. Thereby, the pattern of compressed spots 18 reaches a greater distance into the thick portion 5 in the right end of body 6 than in the left end thereof. This means also that the pattern of compressed spots 18 has a smaller extension outside the right end of the thick portion than outside the left end thereof. The distance, which with the pattern of protrusions reaches into the respective cut-out, is preferably chosen such as at least one row of protrusions in the pattern 17 will reach into the thick portion 5 of a fibrous body 6 around the periphery thereof every time the registration of the thick portion with a cut-out 15 or 16 in the roller 13 is within the determined tolerance. The width of the pattern 17 along each edge must be chosen to ensure that the pattern covers the whole width of the uncompressed region 2a of the thin portion 2 of each body 6 passing the rollers 13, 14. As stated above, the width of the uncompressed region 2a along each side of the thick portion 5 will also vary due to variation in the registration with the respective cut-out 9 or 10 in the roller 7 of the fibrous bodies 6 that successively pass rollers 7, 8.

The thick portion 5 of the fibrous body 6 shown in FIGS. 4, 5 and 5A has been compressed to the desired density by the rollers 11, 12. Therefore, the number of compressed spots per unit area in the thick portion 5 should be few so that the total area per unit area compressed by the protrusions in the pattern of protrusions 17 is small in order to not significantly influence the total density of the thick portion around the edges thereof. On the other hand, in the boundary region of the thin portion 2 outside the edges of the thick portion 5 the strength is proportional to the total compressed area, the greater the compressed area per unit area, the greater the strength of the boundary region. By the use of a pattern of compressed spots 18 in which the number of spots per unit area gradually increases in a direction from an edge of the thick portion 5 towards an adjacent edge of the thin portion 2, a compromise between the above mentioned conflicting demands is obtained. As is evident from FIG. 5A, the distances a, b, c, d between the compressed spots in the pattern 18 are gradually decreasing in a longitudinal direction leading away from the right edge of the thick portion 5. Also in lateral directions a similar decrease in distances is present, i.e. the distance between spots along a lateral line through spot $18_1$ is larger than the distance between spots along a lateral line through spot $18_2$, the distance between spots along a lateral line through spot $18_2$ is larger than the distance between spots along a lateral line through spot $18_3$, etc.

It has also been observed that when the compressed spots in the pattern 18 are near each other, the density of the fibrous material in areas around the spots will also increase. This phenomenon is believed to be caused by interaction between fibers and is therefore dependent on the type of fibers in the body 6, the length of the fibers and also of the distance between the fibers, i.e., the effect is more pronounced the more a fibrous material is compressed.

In the described embodiment, the strengthening of the boundary region between the thick portion 5 and the thin portion 2 is made in a separate step after the steps of compressing the thick and thin portions to a desired density. It is of course possible to perform this strengthening simultaneously as the compressing of the thin portion by providing the roller 7 in FIGS. 1 and 2 with patterns of protrusions corresponding to the patterns 17 on roller 13. In such a case the compressing of the thick portion is preferably performed before the compressing of the thin portion. It is also possible to provide roller 11 in FIGS. 1 and 2 with patterns of protrusions similar to the patterns 17 on the roller 13 and perform the strengthening of the boundary region simultaneously as the compressing of the thick portion to the desired density. A third possibility is to do the compressing of the thick and thin portions of the fibrous body and the strengthening of the boundary region in a single step. This can be done by dimensioning the cut-outs 9, 10 in roller 7 so that the depth of the cut-outs is smaller than the heights of the thick portions to such an extent that the desired density in the thick portions will be obtained and at the same time provide the roller 7 with patterns of protrusions corresponding to the patterns 17 on the roller 13. It is of course also possible to perform the compressing of the thick and thin portions in the same step by a suitable dimensioning of the cut-outs 9, 10 in roller 7 and perform the strengthening of the boundary region in a separate step by rollers 13, 14.

It is possible to perform the strengthening of the boundary region before the compressing of the thick and thin portions. Such an order has the advantages of an easy penetration of the loosely bonded portions and an easier alignment of the opening in the pattern of protrusions and the thick portion since no baking out effect of this portion due to compression has then occurred. If the strengthening of the boundary region is performed as a last step, i.e., after the compression of the thick and thin portions, the density increase of the fibrous material in areas around the spots due to interaction between fibers will be more enhanced and the length of the protrusion need not be as long since the thick and thin bodies have a decreased thickness after compression.

It is also possible to provide roller 14 with patterns of protrusions similar to the patterns on roller 13 with central openings in the patterns corresponding in positions to the cut-outs in roller 13.

It is also pointed out that if the strengthening of the fibrous body is performed in a separate step, the cut-outs 15, 16 in the roller 13 can be dispensed with independent of whether this step is performed before, intermediately, or after the steps of compressing the thick and thin portions.

In the described embodiment the gradual increase in compressed area per unit area in the fibrous body 6 is obtained by a pattern 17 having a gradual increase of the number of protrusions per unit area in directions leading away from the edges of the cut-out 15, 16. It is, however, possible to vary the size of the protrusions in the pattern instead of the number of protrusions per unit area. Thus, the gradual increase in compressed area per unit area can be obtained by a gradual increase in size of the protrusions in the pattern.

A third way to vary the amount of compression in the boundary area of the thin portion is to vary the depth of the compressed spots in the fibrous body 6 by having a gradual increase in length of the protrusions in the pattern 17 in directions leading away from the edge of the cut-outs 15, 16. By such a pattern the depth of the compressed spots in the boundary region will be varied.

It is of course possible to combine two or all of the three above mentioned ways to vary the amount of compressions in the pattern of compressed spots, i.e. variation of the number of compressed spots, variation of the size of the compressed spots and variation of the depth of the compressed spots.

The tips of the protrusions can have other forms than half-spheres, for example a tapered or conical shape, a hexagonal shape, a rectangular shape, etc, but the protrusions should preferably taper outwardly so that they can penetrate into the fibrous body while shuffling away a considerable part of the fibrous material at its sides. By the cross-section of the protrusions is meant the cross-section of the largest part of the protrusion that penetrates into the fibrous body during the strengthening of the boundary region of the fibrous body. The pattern of compressed spots need not be a pattern of separate spots but the desired gradualness of the pattern can be obtained by grid of interconnected rods or a combination of grid and dots.

Schematic plan views of different patterns to be used in the present invention are shown in FIG. 6-11. In all of these Figures, showing a part of a fibrous body according to the invention, the thick portion of the body has the reference numeral 5 and the thin portion has the reference numeral 2 and the tolerance ET for alignment of the thick portion and a cut-out is shown by interrupted lines.

Figure 6:
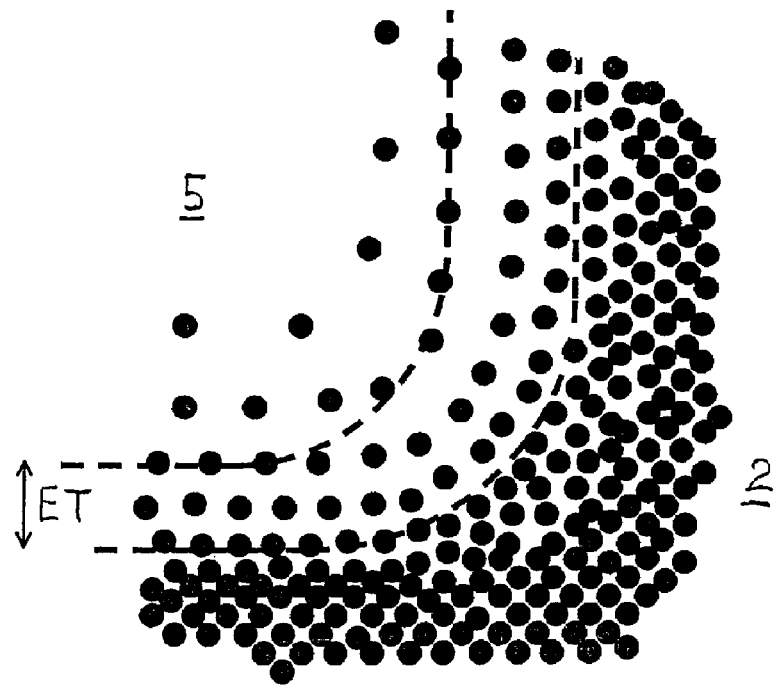
FIG. 6-11 show schematic plan views of a part of an absorbent body according to further embodiments of the invention.

In FIG. 6, a pattern similar to pattern 18 in FIG. 4 is shown in greater detail. The compressions, shown as black dots, have equal thickness and the number of spots gradually increases in directions leading away from the edge of the thick portion.

Figure 7:
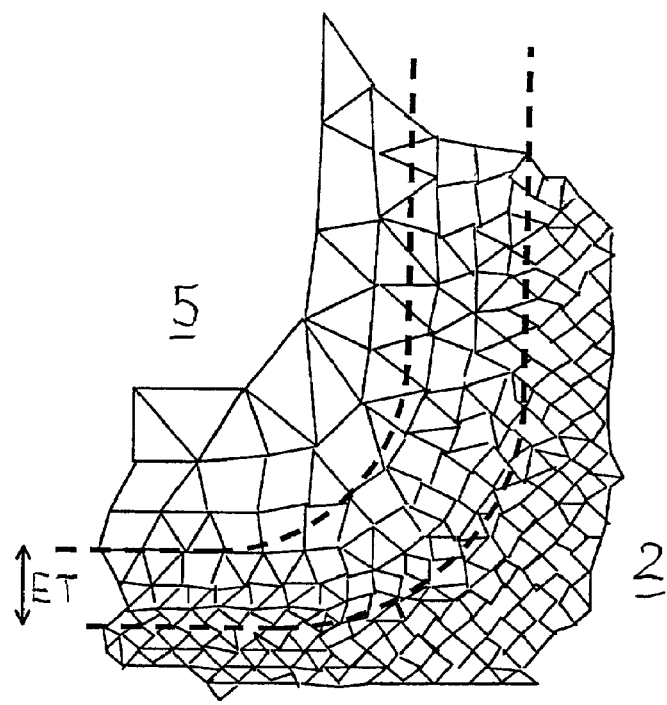

In FIG. 7, the pattern 19 is made up of compressed lines connected to each other. The compressed lines have all equal thickness and the number of lines gradually increases in directions leading away from the edge of the thick portion. Such a pattern of compressed lines is made by a roller having a grid pattern protruding from its peripheral surface.

Figure 8:
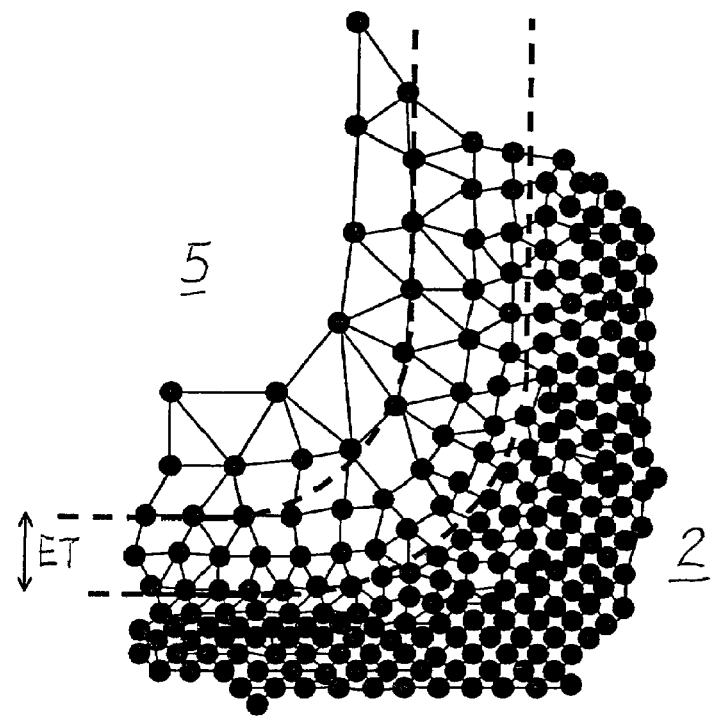

In FIG. 8, the pattern 20 of compressions is a combination of the pattern shown in FIGS. 6 and 7, i.e. a combination of compressed lines and dots.

Figure 9:
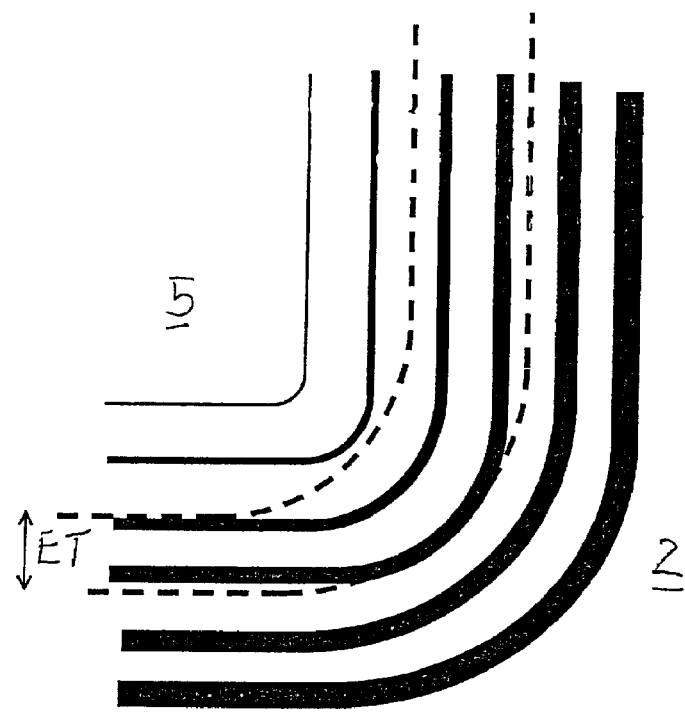

In FIG. 9, the pattern 21 is a pattern of compressed lines running parallel to each other and at the same distance from each other. However, the thickness of the compressed lines is gradually increasing in directions leading away from the edge of the thick portion.

Figure 10:
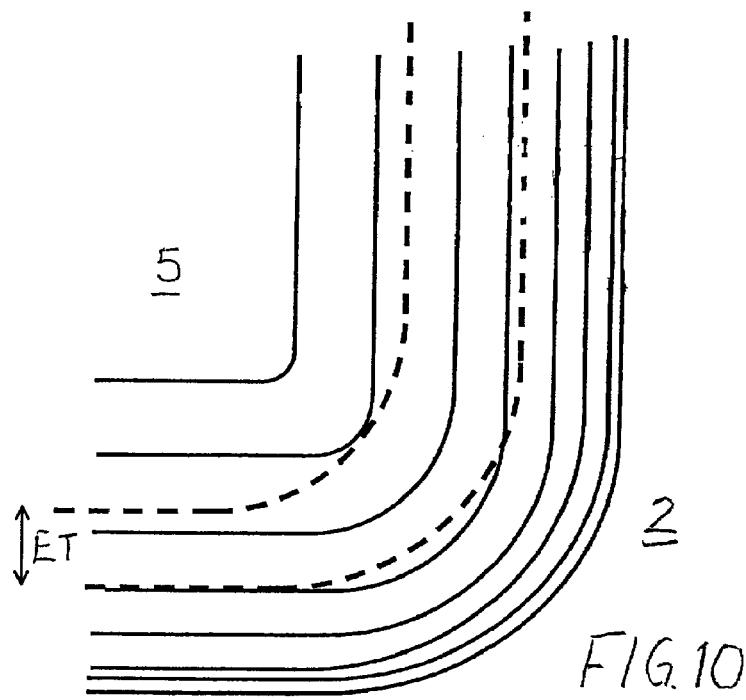

In FIG. 10, the pattern 22 is also a pattern of compressed lines running parallel to each other. The compressed lines have all equal thickness and the number of lines gradually increases in directions leading away from the edge of the thick portion.

Figure 11:
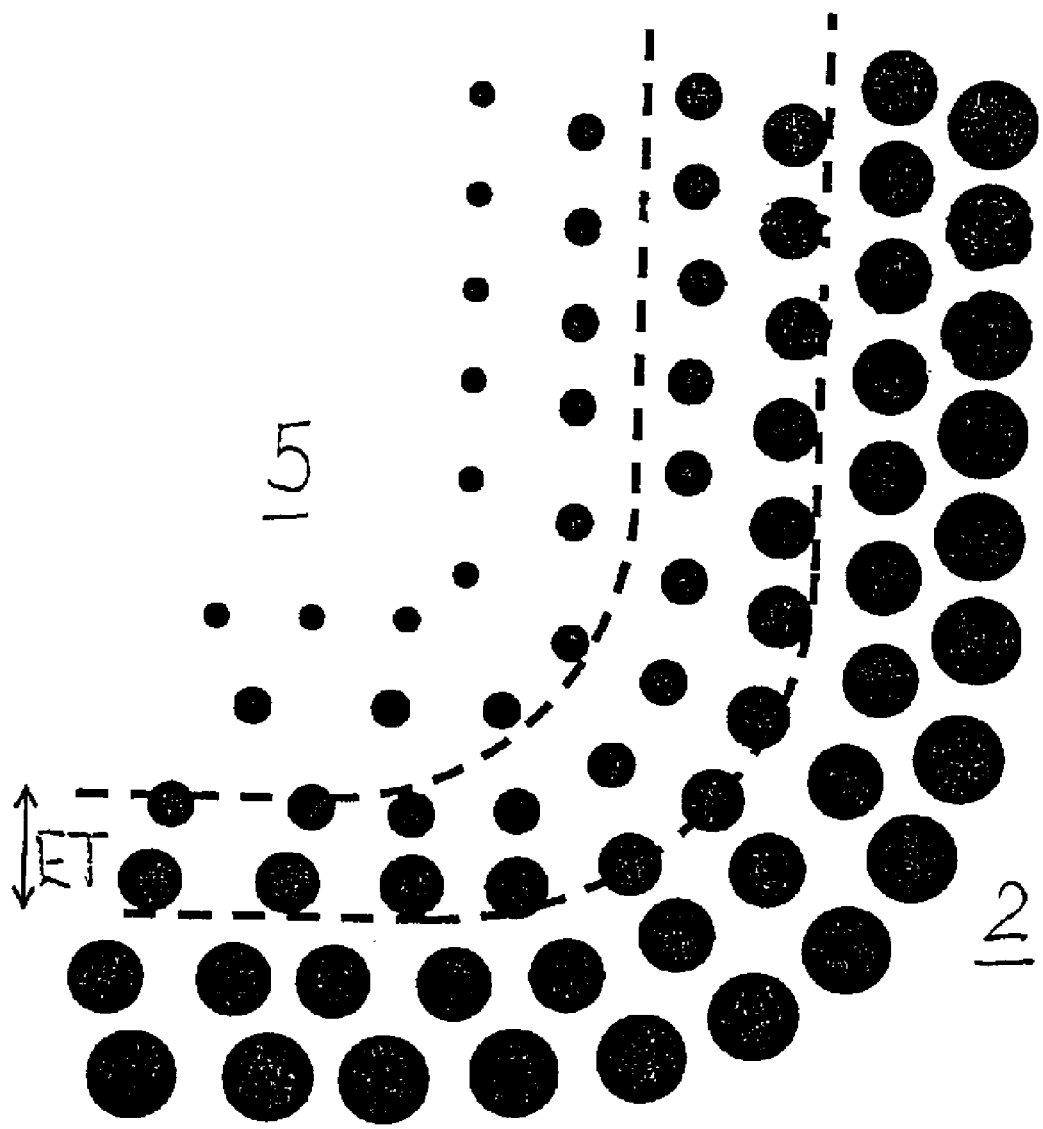

In FIG. 11, the pattern 23 is a pattern of compressed dots disposed at the same distance from each other, the distance being measured between the centers thereof. However, the size of the compressed dots is gradually increasing in directions leading away from the edge of the thick portion.

In this context, the "first portion" and "second portion" of the absorbent body defined in the claims refer to regions having different properties, such as different thickness, density or composition, e.g. when a small core is laid on top of a large core, a first, thick region is built up in the centre and is surrounded by a second thin region.

It is pointed out that the terms "thick portion" and "thin portion" refer to the state in the final body. There might be cases in which a thin portion in the sense of the present invention, laid around a central portion, is thicker than said central portion but is then compressed so that it will be thinner in the compressed state than the central portion. Such and similar cases are to be included in the present invention. There can also be other reasons than differences in thickness for avoiding compression of certain portions of a fibrous body while compressing a portion thereof, for example can a central portion have a desired density or other property which it at risk if the central portion is subjected to the pressure of the rollers compressing the portions outside the central portion. Such situations are also taken care of by the present invention. Furthermore, it could be the outer part that is to be protected so that, instead of a cut-out, an outwardly projecting part on the roller performs the compressing of the central portion, the boundary region to be strengthened then reaching from the edges of central part in a direction towards the centre thereof.

The apparatus schematically shown in FIGS. 1 and 2 is preferably a part of a continuous manufacturing line for disposable absorbent articles, such as disposable diapers, panty diapers, sanitary napkins, incontinence guards and the like. If the running web 3 is a web of casing material, a second web of casing material is superposed onto this web and the row of compressed fibrous bodies contained thereon, after possible intervening process steps, such as the provision of elastics. If the web 3 is not a web of casing material, the bodies 6 are transferred to a running web of casing material. Since the volume of the body 6 is not reduced to any significant extent by the strengthening of the boundary region thereof, it is possible to perform the strengthening step after these bodies are enclosed between two webs of casing material.

The described embodiment can of course be modified in several ways within the scope of invention. Instead of being composed of two air-laid layers 2, 5 separately delivered on the running web 3 the fibrous body 6 can be air-laid in the same mould. The layer or layers in the fibrous body can contain other components mixed into the cellulose fluff, such as particles of superabsorbent material. Also other materials used for compressible cores can be used, such as other natural fibers, synthetic fibers or mixtures thereof, peat, etc. The layers 2, 5 can have other shapes, the layer 2 can for example be rectangular and the layer 5 can have an hourglass shape. Furthermore, the disclosed patterns of protrusions and compressed spots need not be separate patterns but can for example be part of a pattern for providing the whole of the fibrous body with compressed spots or the like, the part of such a pattern lying outside the boundary region could then consists of a regular or irregular pattern. The method and apparatus according to the invention can of course be used for strengthening more than air-laid fibrous bodies, such as wetlaid, carded or other types of compressible cores. The scope of invention shall therefore only be limited by the content of the enclosed claims.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of strengthening a boundary region between a first portion and a second portion of a fibrous body for absorbent articles, which method comprises:
   providing a fibrous body having a first portion and a second portion, wherein the first portion is thicker than the second portion, and wherein the second portion consists of two areas, a first area and a second area;
   feeding the fibrous body to a compressor, the compressor having a cut-out, the cut-out having an area greater than the area of the first portion;
   compressing the entirety of the first area of the second portion to a substantially uniform thin portion thickness, while feeding the first portion and the entirety of the second area of the second portion into the cut-out, wherein the entirety of the second area of the second portion forms a boundary region; and
   strengthening the boundary region by providing said boundary region with a pattern of compressed spots, wherein an amount of compressed surface area per unit surface area is gradually increasing in a direction leading away from an edge of said first portion of said fibrous body towards the first area of the second portion,
   wherein the pattern reaches into the first portion of said fibrous body.

2. A method of strengthening a boundary region between a first portion and a second portion of a fibrous body for absorbent articles, which method comprises:
   providing a fibrous body having a first portion and a second portion, wherein the first portion is thicker than the second portion, and wherein the second portion consists of two areas, a first area and a second area;
   feeding the fibrous body to a compressor, the compressor having a cut-out, the cut-out having an area greater than the area of the first portion;
   compressing the entirety of the first area of the second portion to a substantially uniform thin portion thickness, while feeding the first portion and the entirety of the second area of the second portion into the cut-out, wherein the entirety of the second area of the second portion forms a boundary region; and
   strengthening the boundary region by providing said boundary region with a pattern of compressed spots, wherein an amount of compressed surface area per unit surface area is gradually increasing in a direction leading away from an edge of said first portion of said fibrous body towards the first area of the second portion,
   wherein the pattern has a gradually increasing number of compressed spots per unit surface area in a direction leading away from an edge of said first portion of said fibrous body towards the first area of the second portion, the compressed spots being compressed to the same depth in relation to an upper side of said first portion of said fibrous body.

3. A method of strengthening a boundary region between a first portion and a second portion of a fibrous body for absorbent articles, which method comprises:
   providing a fibrous body having a first portion and a second portion, wherein the first portion is thicker than the second portion, and wherein the second portion consists of two areas, a first area and a second area;
   feeding the fibrous body to a compressor, the compressor having a cut-out, the cut-out having an area greater than the area of the first portion;
   compressing the entirety of the first area of the second portion to a substantially uniform thin portion thickness, while feeding the first portion and the entirety of the second area of the second portion into the cut-out, wherein the entirety of the second area of the second portion forms a boundary region; and
   strengthening the boundary region by providing said boundary region with a pattern of compressed spots, wherein an amount of compressed surface area per unit surface area is gradually increasing in a direction leading away from an edge of said first portion of said fibrous body towards the first area of the second portion, wherein the said pattern has the same number of compressed spots per unit area, the compressed spots having a gradually increasing size in a direction leading away from an edge of said first portion of said fibrous body towards the first area of the second portion, the compressed spots being compressed to the same depth in relation to an upper side of said first portion of said fibrous body.

4. The method according to claim 1, wherein the spots in said pattern are compressed to different depths in relation to an upper side of said first portion of said fibrous body.

5. A method of strengthening a boundary region between a first portion and a second portion of a fibrous body for absorbent articles, which method comprises:
   providing a fibrous body having a first portion and a second portion, wherein the first portion is thicker than the second portion, and wherein the second portion consists of two areas, a first area and a second area;
   feeding the fibrous body to a compressor, the compressor having a cut-out, the cut-out having an area greater than the area of the first portion;
   compressing the entirety of the first area of the second portion to a substantially uniform thin portion thickness, while feeding the first portion and the entirety of the second area of the second portion into the cut-out, wherein the entirety of the second area of the second portion forms a boundary region; and
   strengthening the boundary region by providing said boundary region with a pattern of compressed lines, wherein an amount of compressed surface area per unit surface area is gradually increasing in a direction leading away from an edge of said first portion of said fibrous body towards the first area of the second portion,
   wherein the number of lines per unit surface area gradually increases in directions leading away from the edge of the first portion towards the first area of the second portion.

6. The method of claim 5, wherein the compressed lines have equal thicknesses.

7. A method of strengthening a boundary region between a first portion and a second portion of a fibrous body for absorbent articles, which method comprises:
   providing a fibrous body having a first portion and a second portion, wherein the first portion is thicker than the second portion, and wherein the second portion consists of two areas, a first area and a second area;
   feeding the fibrous body to a compressor, the compressor having a cut-out, the cut-out having an area greater than the area of the first portion;

compressing the entirety of the first area of the second portion to a substantially uniform thin portion thickness, while feeding the first portion and the entirety of the second area of the second portion into the cut-out, wherein the entirety of the second area of the second portion forms a boundary region; and strengthening the boundary region by providing said boundary region with a pattern of compressed lines and dots, wherein an amount of compressed surface area per unit surface area is gradually increasing in a direction leading away from an edge of said first portion of said fibrous body towards the first area of the second portion.

8. A method of strengthening a boundary region between a first portion and a second portion of a fibrous body for absorbent articles, which method comprises:

providing a fibrous body having a first portion and a second portion, wherein the first portion is thicker than the second portion, and wherein the second portion consists of two areas, a first area and a second area;

feeding the fibrous body to a compressor, the compressor having a cut-out, the cut-out having an area greater than the area of the first portion;

compressing the entirety of the first area of the second portion to a substantially uniform thin portion thickness, while feeding the first portion and the entirety of the second area of the second portion into the cut-out, wherein the entirety of the second area of the second portion forms a boundary region; and strengthening the boundary region by providing said boundary region with a pattern of compressed lines running parallel to each other, wherein an amount of compressed surface area per unit surface area is gradually increasing in a direction leading away from an edge of said first portion of said fibrous body towards the first area of the second portion, wherein the thickness of the compressed lines is gradually increasing in direction leading away from the edge of the first portion towards the first area of the second portion.

9. The method of claim 8, wherein the compressed lines are at the same distance from each other.

10. A method of strengthening a boundary region between a first portion and a second portion of a fibrous body for absorbent articles, which method comprises:

providing a fibrous body having a first portion and a second portion, wherein the first portion is thicker than the second portion, and wherein the second portion consists of two areas, a first area and a second area;

feeding the fibrous body to a compressor, the compressor having a cut-out, the cut-out having an area greater than the area of the first portion;

compressing the entirety of the first area of the second portion to a substantially uniform thin portion thickness, while feeding the first portion and the entirety of the second area of the second portion into the cut-out, wherein the entirety of the second area of the second portion forms a boundary region; and strengthening the boundary region by providing said boundary region with a pattern of compressed lines running parallel to each other, wherein an amount of compressed surface area per unit surface area is gradually increasing in a direction leading away from an edge of said first portion of said fibrous body towards the first area of the second portion, wherein the number of lines per unit surface area gradually increases in directions leading away from the edge of the first portion towards the first area of the second portion.

11. The method of claim 10, wherein the compressed lines have equal thickness.

12. The method of claim 1, the method further comprising compressing the first portion to a thick portion thickness, wherein the step of strengthening the boundary region is made in a separate step after the steps of compressing the first portion and the first area of the second portion.

13. The method of claim 1, wherein the step of strengthening the boundary region is made simultaneously as the compressing of the first area of the second portion by providing the compressor with patterns of protrusions.

14. The method of claim 13, the method further comprising compressing the first portion to a thick portion thickness before compressing the first area of the second portion.

15. The method of claim 1, the method further comprising compressing the first portion to a thick portion thickness, wherein the step of strengthening the boundary region is made simultaneously as the compressing of the first portion.

16. The method of claim 1, the method further comprising compressing the first portion to a thick portion thickness, wherein the compressing of the first portion and the first area of the second portion of the fibrous body and the strengthening of the boundary region is in a single step.

17. The method of claim 1, the method further comprising compressing the first portion to a thick portion thickness, wherein the compressing of the first portion and the first area of the second portion is in the same step and the step of strengthening the boundary region is made in a separate step after the step of compressing the first portion and the first area of the second portion.

* * * * *